(12) United States Patent
Bolander, Jr. et al.

(10) Patent No.: US 8,905,576 B2
(45) Date of Patent: Dec. 9, 2014

(54) MOUNT FOR AN ILLUMINATION SOURCE

(75) Inventors: Albert J. Bolander, Jr., Memphis, IN (US); Brian K. Norris, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 579 days.

(21) Appl. No.: 13/108,163

(22) Filed: May 16, 2011

(65) Prior Publication Data
US 2012/0120652 A1 May 17, 2012

Related U.S. Application Data

(60) Provisional application No. 61/334,769, filed on May 14, 2010.

(51) Int. Cl.
| F21S 8/10 | (2006.01) |
| F21V 7/04 | (2006.01) |
| F21V 7/00 | (2006.01) |
| F21V 7/09 | (2006.01) |
| G02B 19/00 | (2006.01) |
| F21Y 101/02 | (2006.01) |

(52) U.S. Cl.
CPC ............. F21V 7/048 (2013.01); F21S 48/1159 (2013.01); F21S 48/137 (2013.01); F21V 7/0008 (2013.01); F21V 7/09 (2013.01); G02B 19/0066 (2013.01); G02B 19/0071 (2013.01); G02B 19/0023 (2013.01); G02B 19/0061 (2013.01); F21Y 2101/02 (2013.01)
USPC ............ 362/235; 362/516; 362/517; 362/518

(58) Field of Classification Search
USPC ............ 362/235, 516, 517, 518, 296.08, 346, 362/217.06, 296.06
See application file for complete search history.

(56) References Cited

U.S. PATENT DOCUMENTS

| 6,234,646 | B1 * | 5/2001 | Ito ................................. 362/235 |
| 6,841,804 | B1 | 1/2005 | Chen et al. |
| 7,048,412 | B2 * | 5/2006 | Martin et al. ................. 362/247 |
| 7,829,899 | B2 | 11/2010 | Hutchins |
| 2004/0223338 | A1 | 11/2004 | Koike et al. |
| 2005/0041436 | A1 | 2/2005 | Ishida |
| 2006/0181872 | A1 * | 8/2006 | Pashley ........................ 362/231 |
| 2009/0168428 | A1 | 7/2009 | Huang |
| 2009/0316384 | A1 | 12/2009 | Kanayama et al. |

FOREIGN PATENT DOCUMENTS

| EP | 1298383 | 4/2003 |
| EP | 1371901 | 12/2003 |

OTHER PUBLICATIONS

European Search Report dated Dec. 23, 2011.
European Application No. 12177728.8 Search Report mailed Sep. 4, 2012.

* cited by examiner

*Primary Examiner* — Sharon Payne
(74) *Attorney, Agent, or Firm* — Woodard, Emhardt, Moriarty, McNett & Henry LLP

(57) ABSTRACT

Certain disclosed embodiments use two substantially hemispherical illumination sources, mounted on a mount that allows the illumination sources to illuminate both sides of the reflector, allowing both halves of the reflector, with 2 pi rotation, to be used for generating the lighting distribution. This system and method both increases the amount of light collected and increases the efficiency of the illumination source.

19 Claims, 15 Drawing Sheets

C-6/C-6

CC-6/CC-6

C08/C-8

C-6/C-6

CC-6/CC-6

MOUNT FOR AN ILLUMINATION SOURCE

CROSS-REFERENCE TO RELATED APPLICATION

This application claims the benefit of the filing date of U.S. Provisional application No. 61/334,769, filed May 14, 2010, which is hereby incorporated by reference in its entirety.

TECHNICAL FIELD OF THE DISCLOSURE

The present disclosure generally relates to lamps and, more particularly, to a mount for a substantially hemispherical illumination source.

BACKGROUND OF THE DISCLOSURE

In any lighting system, the illumination source and the optics used to direct and focus the light produced by the illumination source determine the lighting distribution produced by the lighting system. Likewise, to achieve a given lighting distribution there are only certain optics and illumination source combinations that will produce the desired lighting distribution. The design of the illumination source then governs the design of the optics that will produce the desired lighting distribution. The more specific the requirements are for the desired lighting distribution, the more difficulty is encountered in effectively controlling the lighting distribution.

Most of the current lighting technology uses a filament bulb as the source, with the optics consisting of a reflector, a lens, or a combination of a reflector and a lens. Reflectors that are designed for non-imaging optics use reflecting surfaces that are some form of second order polynomial or a conic surface. A parabolic reflector is the most common type and it will be used as an example herein, but the same principles apply to any conic reflector or piecewise conic reflector.

The shape of the illumination source determines the light distribution emitted from that illumination source. For example, a point source emits a spherical distribution. A filament emits a donut shape distribution for a simple straight filament. For a filament that curves or bends, the distribution is the sum of all the donut shaped distributions emitted in each straight section.

Since the package size, which is fixed by the allowable lamp geometry, is limited, the source location and design can improve the lamp efficiency. The value for the focal length of the reflector determines the depth and size of the reflector, which then determines the minimum size of an image in the distribution. The minimum illumination source image size is the smallest feature that is controllable in the lighting distribution. In some area lighting applications, this is not important. In applications with very specific lighting distributions, this can be critical.

This scaling of the reflector within a fixed size limit and lighting distribution directly affects the efficiency of the lamp. The efficiency of the lamp can be measured as the number of useable lumens (the amount of light) in the planned light distribution pattern divided by the number of lumens produced by the illumination source. The scaling of the focal length with a fixed size limit will produce one of three types of reflector.

Referring to FIG. 1, the depth and size of a reflector is determined by the focal length and the width limit for the lamp. A parabola with a long focal length will fill the available space without capturing all of the light, since the reflector does not extend as far as the latus rectum. The latus rectum 10 for a parabola 12 is a line through the focus 14 and perpendicular to the axis 16 of the parabola 12 (defined as parallel to directrix), as shown in FIG. 1. The width limit 18 of the lamp is dictated by the design criteria for the lamp. Since this reflector 12 would extend past the width limit 18 of the lamp before reaching the latus rectum 10, the width limit 18 prevents the use of a reflector 12 that would capture all of the light emitted by the hemispherical illumination source.

The next case has a decreased focal length so that the parabola 12 is deeper. The performance limit is the special case where the latus rectum 10 crosses the parabola 12 at the exact width limit 18 required for the lamp, as shown in FIG. 2. This reflector 12 would collect the maximum amount of light from the illumination source with no shaded areas. This gives the maximum collection of light for a hemispherical source but limits the light distribution that can be produced by the lamp since there is only one focal length for a given width. Unfortunately, the available space for a headlamp in practice rarely corresponds to this ideal situation. As illustrated in FIG. 3, the third case is to have a required focal length 14 that is less than that which is ideal for the width limit 18 of the lamp, resulting in all of the light from the illumination source being captured by the reflector 12, but much of the outer reaches of the reflector 12 receiving no light from the hemispherical illumination source.

For the case shown in FIG. 2, the maximum distance to the reflector 12 from the illumination source is at the latus rectum 10 and the shortest distance is at the vertex 20. The shortest distance to the reflector 12 determines the largest angle of projection of the source and the largest distance to the reflector 12 determines the smallest angle of projection of the source. For any given width in the case shown in FIG. 2, these distances and angles are fixed and can not be changed if they do not meet the requirements for a lamp. First, increasing the depth of the parabola 12 increases the light capture angle. Continuing to increase the depth of the parabola 12 eventually results in the sides of the reflector 12 extending beyond the latus rectum 10 of the parabola 12. Second, decreasing the distance between the illumination source and the reflector vertex 20 increases the angular size of the illumination source in the reflector 12, thus increasing the size of the image of the source in the design distribution. For a given focal length 14, the angular size of the illumination source in the reflector 12 decreases as the point of reflection moves from the vertex 20 to the latus rectum 10. This is because the cosine projected area of the illumination source is decreasing and the distance between the point of reflection and the illumination source is increasing, as shown in FIG. 4.

When the illumination source is a filament, continuing to move the illumination source past the latus rectum 10 initially increases the angular size of the source in the reflector 12 because the cosine projected area of the illumination source increases. However, eventually the increasing distance between the illumination source and the reflector 12 overcomes this and the angular size of the illumination source in the reflector 12 starts to decrease. (The cosine projected area of the illumination source reaches a minimum when the point of reflection is at the latus rectum 10 of the reflector 12.)

For general lighting, such as halogen bulb headlamps, the filament in the incandescent bulb can be oriented in any direction. In vehicular light applications, most bulbs have a straight filament that is oriented either Transverse or Axial. The Transverse Filament (TF) illumination source 22 has its wire or coil oriented perpendicular to the axis of symmetry 16 of the bulb (see FIG. 4). This in turn makes the filament 22 transverse or perpendicular to the optical axis. In most cases, since the bulb is usually viewed along the optical axis of the lamp, a TF source will project a different light distribution for reflection in the direction of the filament 22 than in the direction perpendicular to the axis of the filament 22.

As shown in FIG. 5, the filament 24 can also be mounted axially so that the focal length can be made as short as needed. However, even some of the emitted light 26 will never hit the parabolic reflector 12 and is therefore lost, as illustrated at 28 in FIG. 5. When using a hemispherical illumination source, such as an LED source, only half of the parabolic reflector 12 is in the hemisphere of emitted light 26. This is because LED light sources emit all of their light on one side of the source, into a hemisphere. The other side of an LED light source needs to be connected to a heat sink.

The image size produced from a section of a reflector 12 depends on the shape of the reflector 12 surface and the distance from the illumination source. The smallest image size is limited by the distance of the reflector 12 from the illumination source. Depending on the width limits 18 of the reflector 12, the maximum distance may be before the latus rectum 10, at it or beyond it. The focal length affects the shape and size of the reflecting surface. The longer the focal length, the larger the width of the reflector 12 becomes for a fixed distance from the vertex 20 or the latus rectum 10. The vertex 20 of the reflector 12 is the point where the optical axis 16 would cross the reflector 12. In the following figures, the maximum width will be fixed as it is in most practical cases. The lamp will stop at the point where the reflector parabola 12 crosses the vertical lines 18 (indicating the maximum allowed lamp width) in the figure.

Incandescent vehicle headlamps have been designed with two filaments in the bulb. Typically, one filament is used for the low beam and the other is used for the high beam. FIG. 6 illustrates several dual filament configurations for bulbs. Optical design techniques have been developed for a single reflector lamp that utilizes the offset of the filament sources to switch between low beam and high beam in the headlamp system. In the dual filament bulb, the filaments are offset from each other by a physical displacement. In most cases, one filament is designed to produce more light than the other. In the design of the optics, one filament is designed to be at the focus 14 and the other is offset from the focus 14 by some physical displacement distance. This offset in the illumination source position causes an offset in the light distributions produced by the two filaments. Such a lamp more effectively utilizes the reflector area for low and high beam operation.

Light emitting diode (LED) headlamps have used a combination of prior art techniques to project the image of LEDs into desired photometric distributions. Early designs used lens optics in conjunction with point sources. These proved to be difficult to design and manufacture, as the photometric distribution had to be constructed from point sources.

An advancement in LED packaging technology has since provided LEDs in an array. Examples of LED sources configured in arrays (linear and two-dimensional) are shown in FIGS. 7 and 8.

Prior art LED headlamps that use these arrays all use existing optical concepts currently used in incandescent or high intensity discharge (HID) lighting. These include lens optics, reflector optics, or a combination of the two. While no optical system can collect 100% of the emitted light, a good filament design can put 50% to 80% of the emitted light into the design distribution. As the currently disclosed technology focuses on reflector technology, the discussion of the prior art LED headlamps will address use of reflectors with LED arrays.

The current state of headlamp design is moving from incandescent bulbs to LED illumination sources. The orientation of the incandescent bulb's filament is either transverse or axial with respect to the optical axis of the illumination sources. The LED package (an array of dies or one single die) lends itself to a similar type of reflector design as the filament based lamps. The one major difference between a filament and an LED, however, is that a filament emits light in all directions when energized, while an LED emits light only in one hemisphere. Mounting an LED in one of the two standard axial or transverse orientations limits the collection efficiency or the size of the lamp, respectively. This has necessitated a different approach for LED forward lighting designs. One of those approaches has been to use lens-based optical systems, with the lens in front of the LED and directly imaging it onto the road. While this approach is mechanically simple, it is not very efficient at collecting all of the light from the LED. The most common reflector-based approach has been to use half of a reflector, with the LED mounted on the axis of the reflector and pointing to the side. This approach has the potential for high efficiency, but only by making the reflector very large or by sacrificing the ability to make a highly focused beam. Another reflector-based approach is to aim the LED directly back into the reflector. This has the advantage of being able to collect all of the light from the LED, but the disadvantage is that there is only one focal length for any given width and the LED mount blocks a significant portion of the light coming from the reflector. This disadvantage is made worse by the fact that it blocks the light coming from the center of the LED, which is where the highest light flux originates.

FIG. 9A illustrates the obvious disadvantage to mounting an LED array 24 in an axial position. Light in the area 28 misses the reflector 12. Light in the area 30 contacts the reflector 12 and contributes to the lighting distribution of the lamp. However, since light is only emitted on one side of the LED array 24 package, the reflector 12 on the other side provides no effect to the lighting distribution since it is in the region 32 where no light is emitted.

As shown in FIG. 9B, all of the light from a transverse mounted LED 22 can be collected as long as the reflective surface 12 fills the hemisphere 40 illuminated by the LED 22. The problem involves the relationship between the LED 22 location and the limits of the collecting optics. The sources 22 are usually placed at or near the focal point 14 of the optics. For an LED, the light stops at the latus rectum 10 since no light is emitted from the back side. Moving along the reflector 12 away from the optical axis, the image will shrink much faster for the LED than for the filament since the projected cross-section of the source is decreasing along with the increasing distance between the reflector surface and the illumination source, with the image eventually approaching zero. As the largest images will be produced from the vertex 20 of the reflector 12, this area is used for spread light. The small images near the latus rectum 10 are best used for the highly focused parts of the beam; however, in the transverse mounting condition, only a small amount of the luminous flux of the LED is emitted at such wide angles, limiting the brightness of the high intensity areas.

Therefore, there is a need for improved designs for headlamps. The present disclosure is directed toward meeting this need.

SUMMARY OF THE DISCLOSURE

Certain disclosed embodiments use two substantially hemispherical illumination sources, mounted on a mount that allows the illumination sources to illuminate both sides of the reflector, allowing both halves of the reflector, with 2 pi rotation, to be used for generating the lighting distribution.

This system and method both increases the amount of light collected and increases the efficiency of the illumination source.

In one embodiment, an illumination source is disclosed, comprising: a reflector having an optical axis; and a first substantially hemispherical illumination source having a first source axis, said first substantially hemispherical illumination source being disposed adjacent said reflector; wherein said first source axis and said optical axis form a first angle therebetween, said first angle being greater than zero degrees and less than 90 degrees.

In another embodiment, an illumination source is disclosed, comprising:

a reflector; a mounting structure disposed adjacent said reflector, the mounting structure comprising a first mounting surface and a second mounting surface; wherein said first and second mounting surfaces are formed at a first angle to one another; a first substantially hemispherical illumination source mounted to said first mounting surface; and a second substantially hemispherical illumination source mounted to said second mounting surface.

Other embodiments are also disclosed.

DETAILED DESCRIPTION OF THE DISCLOSED EMBODIMENTS

Figure 1:
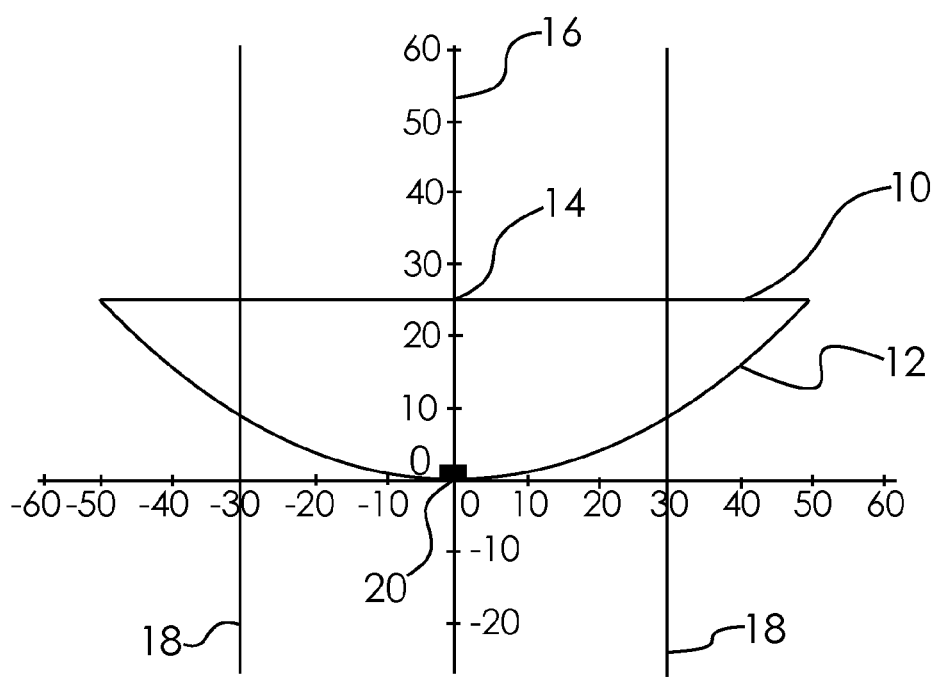
FIG. 1 is a schematic diagram of a parabolic reflector.
Figure 2:
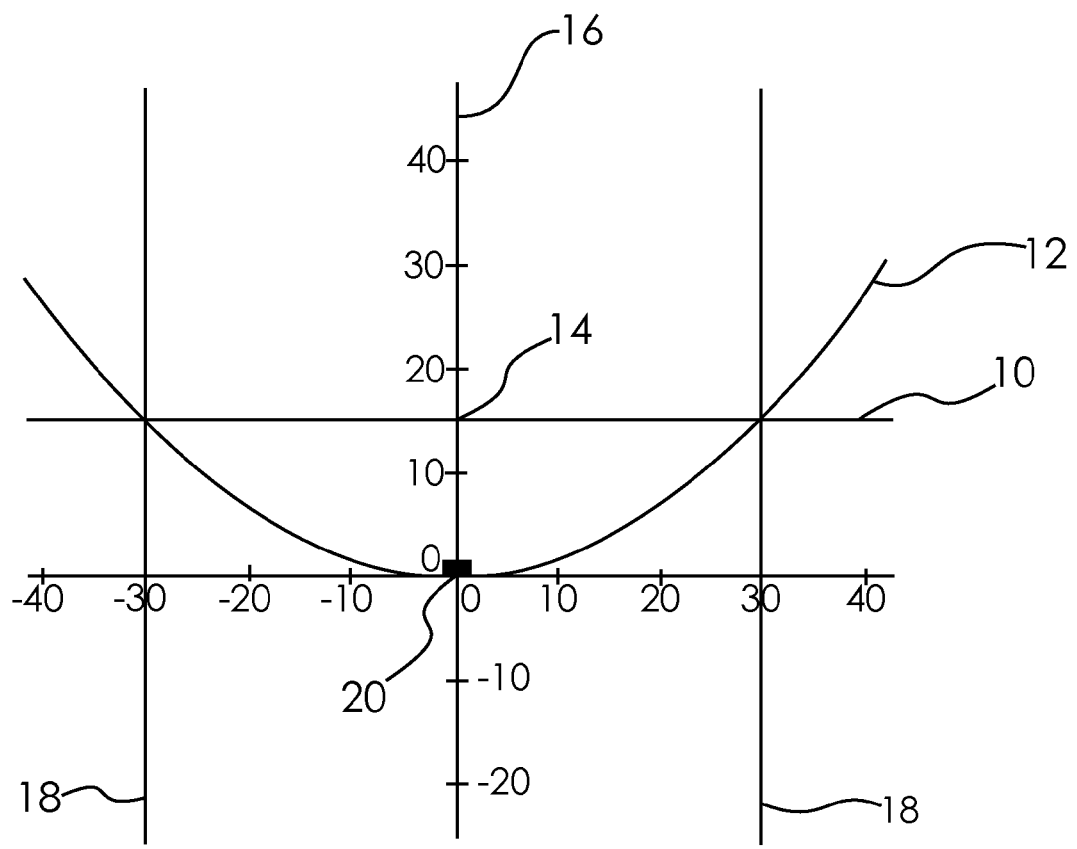
FIG. 2 is a schematic diagram of a parabolic reflector.
Figure 3:
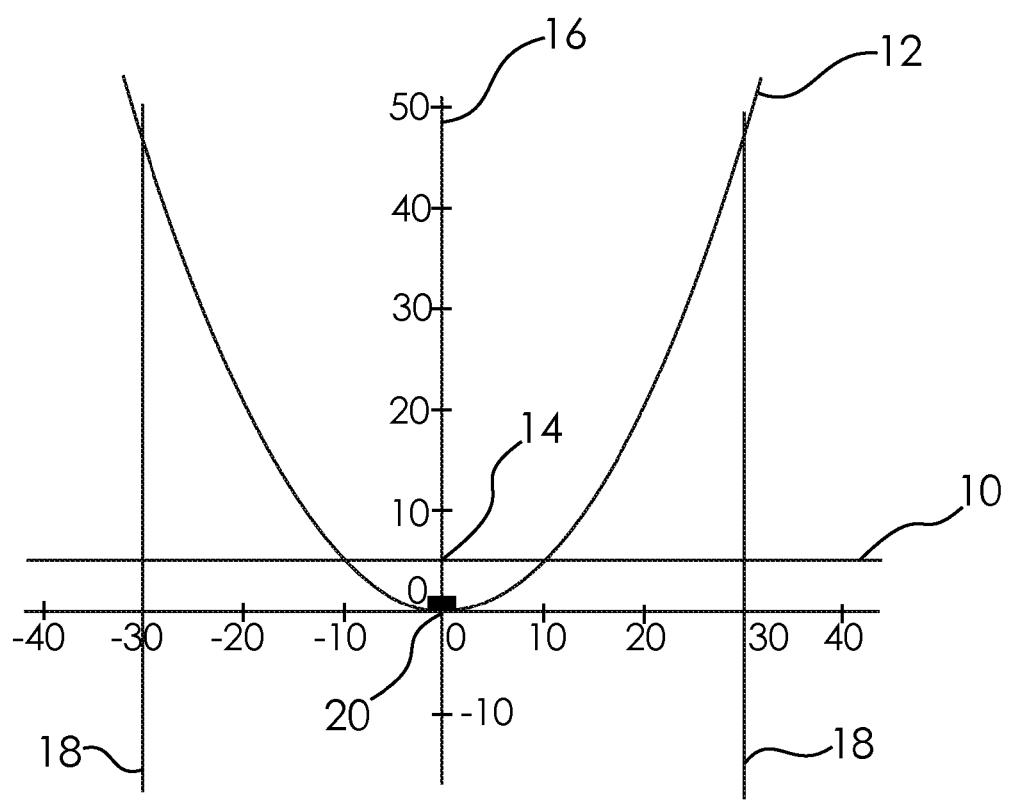
FIG. 3 is a schematic diagram of a parabolic reflector.
Figure 4:
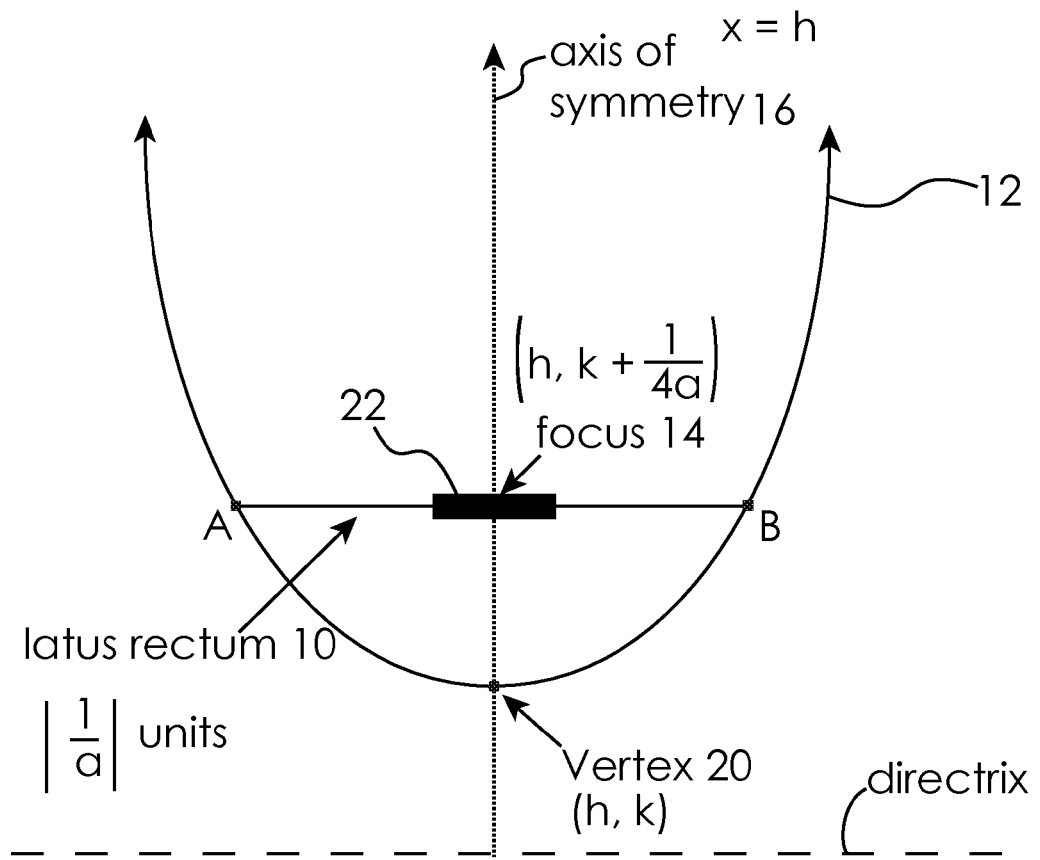
FIG. 4 is a schematic diagram of a parabolic reflector having a transverse filament illumination source.
Figure 5:
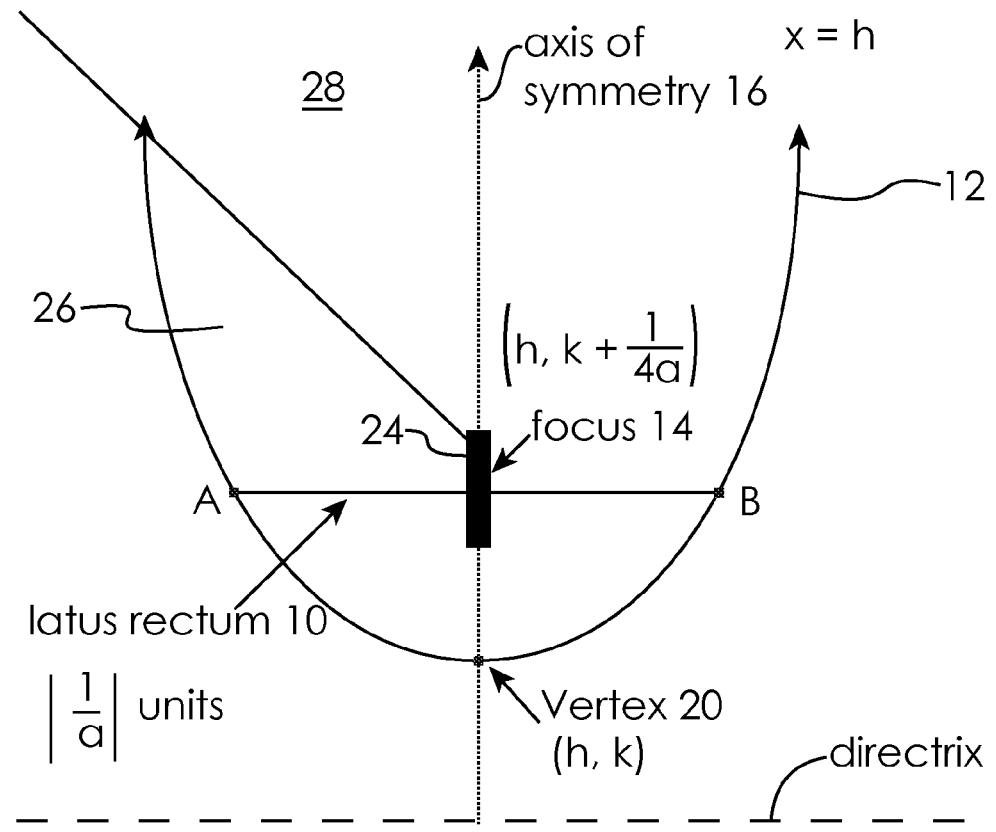
FIG. 5 is a schematic diagram of a parabolic reflector having an axial filament illumination source.
Figure 6A:
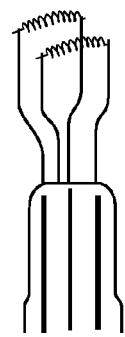
FIGS. 6A-E are schematic diagrams of dual filament illumination sources.
Figure 6B:
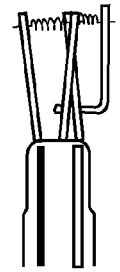
Figure 6C:
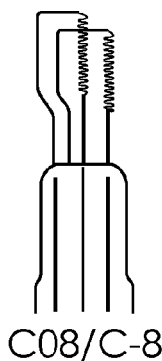
Figure 6D:
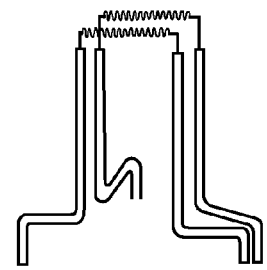
Figure 6E:
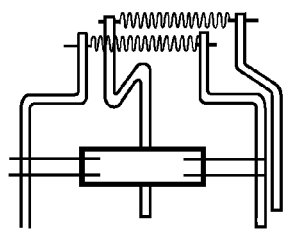

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

In certain embodiments, the present disclosure is directed to a lamp.

In certain other embodiments, the present disclosure is directed to devices and methods that allow hemispherical illumination sources to be mounted within a reflector such that the efficiency of the lamp is improved. Although the presently disclosed embodiments will work with any hemispherical (or substantially hemispherical) illumination source, the disclosure makes reference to LED illumination sources for convenience of description. No limitation of the disclosure is thereby intended or to be inferred.

For a reflector based lighting system, the most efficient way to mount LEDs may be to rotate the axis of the LED off the optical axis 16, somewhere between the transverse mounting 22 and axial mounting 24.

The presently disclosed embodiments utilize an additional illumination source directed toward the opposite side of the reflector, allowing both halves of the reflector, with 2 pi rotation, to be used to construct the lighting distribution. This method both increases the amount of light collected and increases the efficiency of the headlamp.

Figure 7:
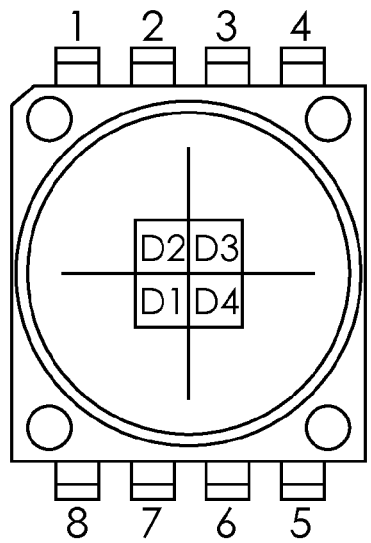
FIG. 7 is a schematic diagram of a two-dimensional LED array.
Figure 8:
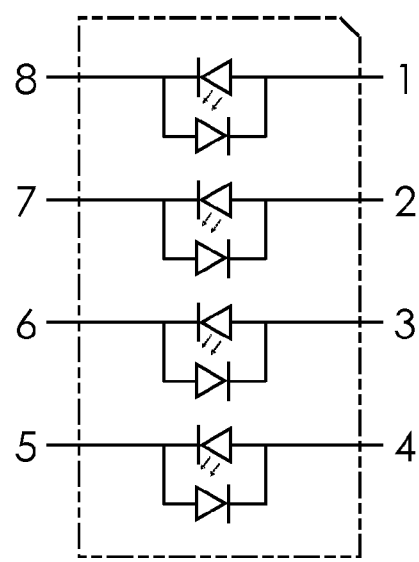
FIG. 8 is a schematic diagram of a linear LED array.
Figure 9A:
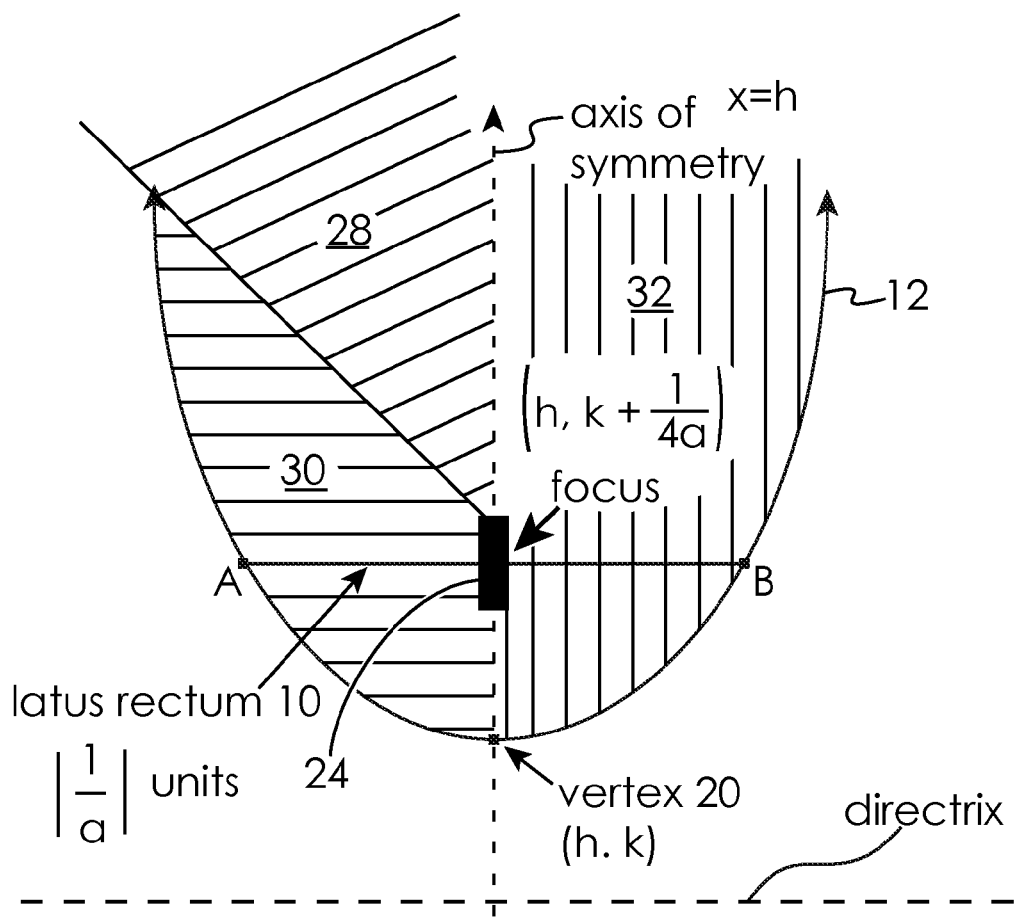
FIG. 9A is a schematic diagram of a parabolic reflector having an axial LED illumination source, illustrating the distribution of light projected onto the reflector.
Figure 9B:
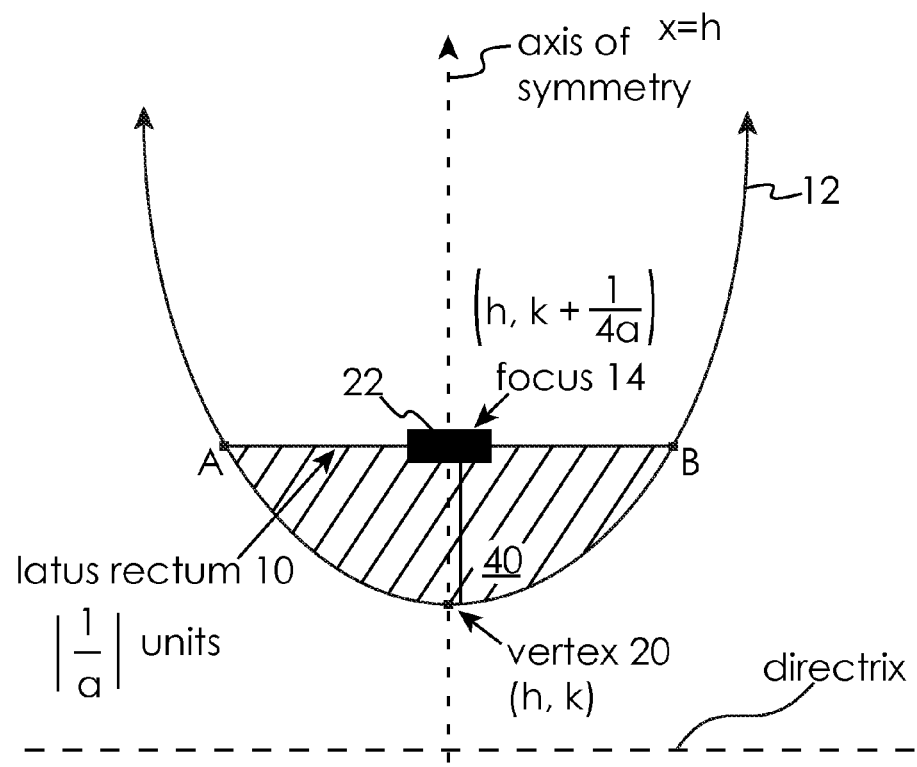
FIG. 9B is a schematic diagram of a parabolic reflector having a transverse LED illumination source, illustrating the distribution of light projected onto the reflector.
Figure 10:
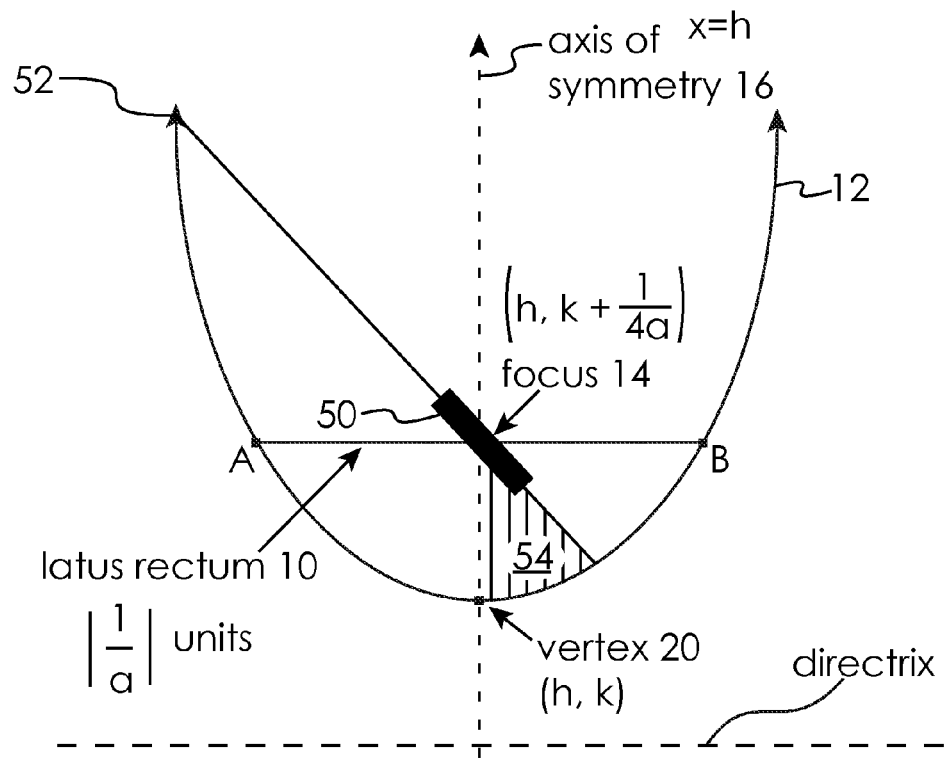
FIG. 10 is a schematic diagram of a parabolic reflector having a hemispherical illumination source mounted at an angle to the optical axis, according to one embodiment of the present disclosure.

It will be appreciated that a substantially hemispherical illumination source may be defined to have a source axis. In the case of a linear array such as that illustrated in FIG. 8, the source axis comprises the longitudinal axis of the array. In the case of a single source or an array such as that illustrated in FIG. 7 where a plurality of sources are arranged in a two dimensional array, the source axis may be defined to be any axis lying in the plane defined by the plurality of sources. In certain embodiments, the axis of the source is mounted off the optical axis 16 or at an axial location forming an angle with the optical axis 16 that is less than perpendicular (i.e. less than the transverse)(90° mounting 22). For example, FIG. 10 shows an illumination source 50 that is mounted so that its axis is in line with the edge 52 (distal of the vertex 20) of the parabola 12. Some light will fall on the parabolic reflector 12 in the region 54 past the line from the focal point 14 to the vertex 20. The light in region 54 will be dim and have a small angular size because of the projected cross sectional area. However, this light will allow at least a portion of the second half of the parabola 12 (i.e. the half that is not illuminated in FIG. 9) to contribute to the lighting distribution of the lamp.

Figure 11:
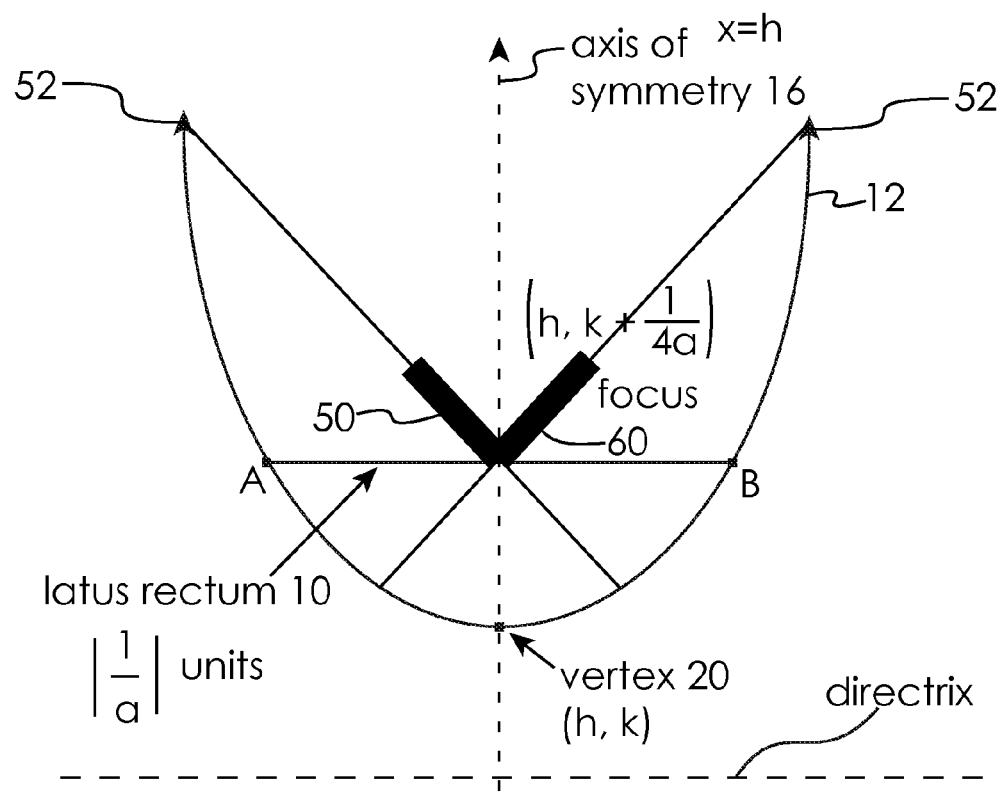
FIG. 11 is a schematic diagram of a parabolic reflector having two hemispherical illumination sources, each mounted at an angle to the optical axis, according to one embodiment of the present disclosure.

However, as shown in FIG. 11, an additional source 60 can be mounted on the opposite side of the parabolic reflector 12, allowing for both halves of the reflector 12 to be fully used and increasing the amount of light falling on the center part of the reflector 12 near vertex 20. This in turn will increase the amount of light in the spread area of the light distribution (or whichever portion of the light distribution the center portion of the reflector 12 is used to produce). The two LED arrays 50, 60 make a V-shaped source when viewed perpendicular to the plane containing the optical axes of both sources 50, 60 and the reflector 12 optical axis. In some embodiments, the two LED arrays 50, 60 intersect substantially at the focus 14 of the reflector 12. The sides of the reflector 12 can extend past what would be the latus rectum 10 of the parabola up to the point 52 where the reflector 12 surface intersects the source cutoff, and still redirect light from the LED sources 50,60. The most efficient reflector 12 will be one where the widest part of the reflector 12 corresponds to this point 52.

Any reflector 12 surface extending perpendicular to the plane of the "V" will be shadowed beyond the vertex of the V. To utilize this section of a lamp, an LED source can be mounted on a third face of the LED source mount that directs light into the unused or shadowed part of the reflector 12. This third LED source can also be used for additional functions, such as increasing light in the high beam or foreground distribution.

Figure 12:
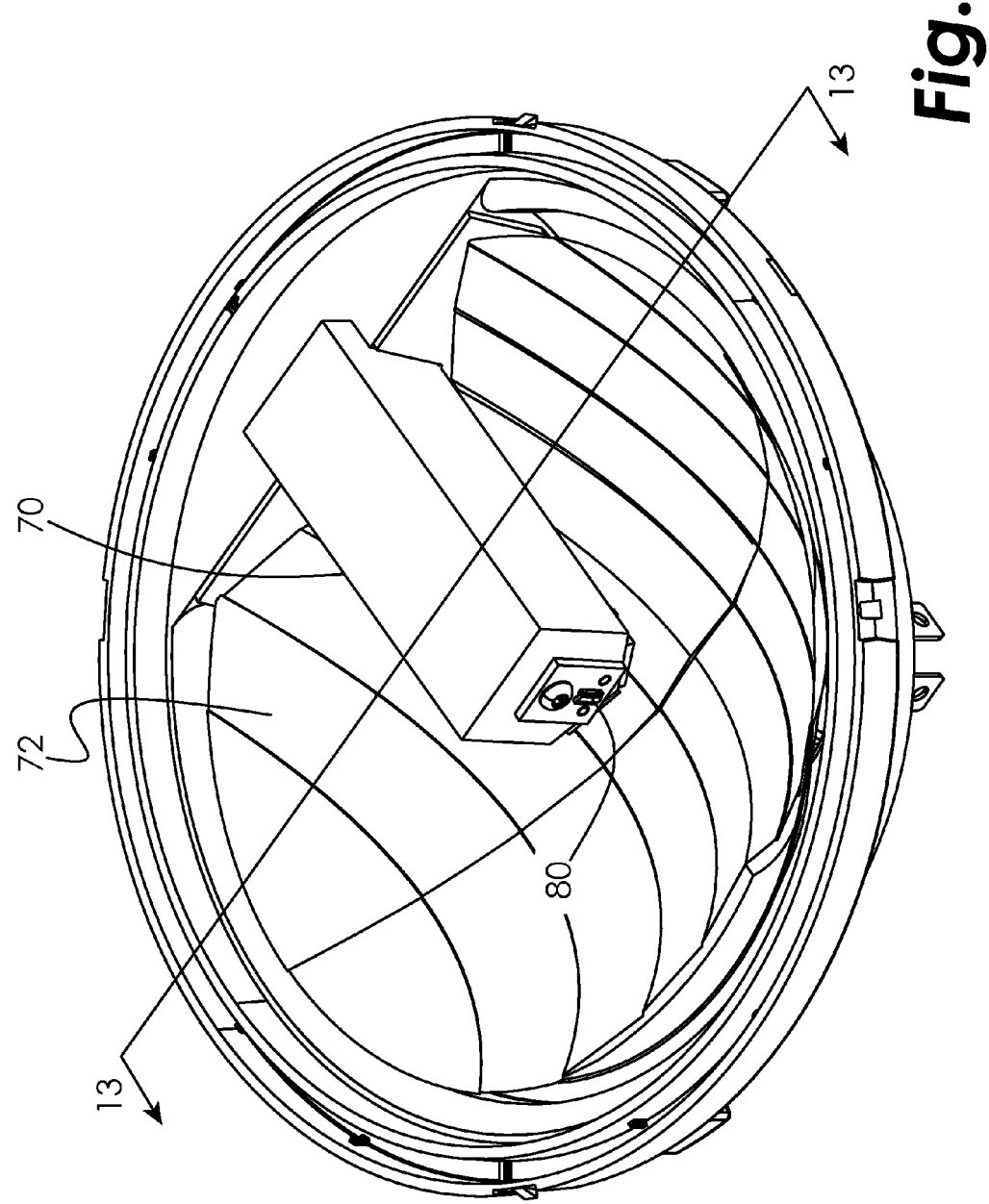
FIGS. 12-14 are schematic diagrams of a parabolic reflector having two hemispherical illumination sources, each mounted at an angle to the optical axis, and a third hemispherical illumination source mounted perpendicular to the first and second illumination sources, according to one embodiment of the present disclosure.
Figure 13:
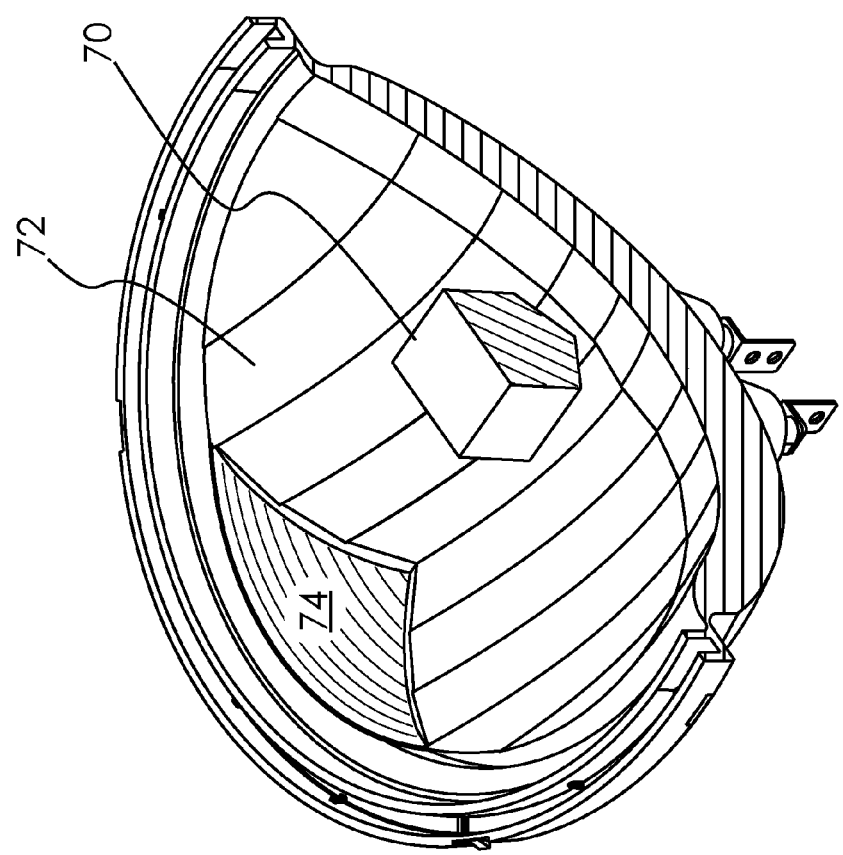
Figure 14:
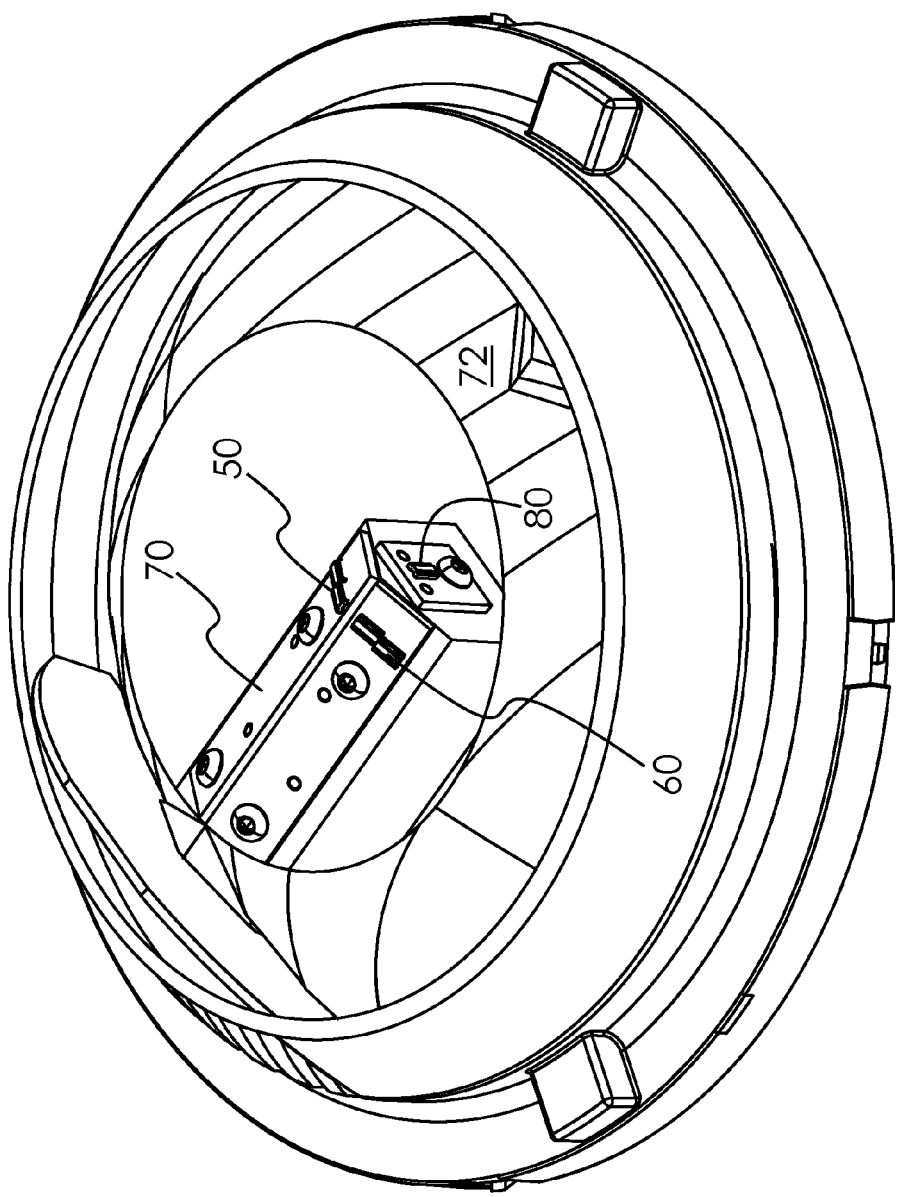

FIGS. 12-14 provide examples of the concept. FIG. 12 is a view into the front of the lamp illustrating an example of how the LED sources can be attached to a mount 70 set with respect to the reflector 72. The mount 70 attaches to an edge of the reflector 72 and extends to the center of the reflector 72. The underside of the mount 70 forms the "V" shape to which the sources 50, 60 are mounted. The "V" shape of the mount 70 can be better seen in the cross-sectional view of FIG. 13, as well as in the bottom cross-sectional view (through the reflector) of FIG. 14. This view clearly shows the two LED packages 50, 60 set at an angle to increase the efficiency of the light coupled to the reflector 72. The mount 70 may include heat sinks to carry heat away from the LED packages 50, 60. Alternatively, the mount 70 itself may be made from a thermally conductive material in order to carry heat away from the LEDs.

Because the LEDs 50, 60 emit light only in a hemisphere, the section of the reflector centered below the end of the "V"-pillar mount does not receive any light from the two LEDs on the v-pillar. By placing a third LED on the end of the "V"-pillar, this area of the reflector can be used to supplement the light coming from the main two LEDs 50, 60. One application of this concept is a section of reflector that adds extra light to the center of a high beam distribution. The third LED illumination source 80 is placed to direct light to the shadowed section of the reflector 72. As explained hereinabove, this section of the reflector 72 is not illuminated by the LEDs 50, 60 in the "V." FIG. 13 shows the section 74 at the bottom of the lamp were the reflector 72 wound not be illuminated by the two LEDs 50, 60 in the "V"-shaped mount. This is the area that is illuminated by the third source 80.

As illustrated in FIG. 6 above, some prior art dual filament headlamp designs use offset filaments to get both a low and a high beam distribution from one lamp. High powered LEDs used for forward lighting functions are usually created as a linear array of several LEDs on a die. This linear array forms a light-emitting area of rectangular shape that can then be imaged onto a road as a beam distribution that is narrow vertically but wide horizontally. By shifting this array slightly, it is possible to cause the beam distribution to shift as well. If two arrays are mounted with one shifted slightly with respect to the other, it is possible to have two distinct beam distributions with one shifted with respect to the other. This allows the construction of a high and low beam headlamp, for example. Therefore, it is possible to move the lighting distribution by selecting which dies are energized. Individual dies or groups of dies can be turned on or off, shifting the lighting distribution as the relationship between the position of the active illumination source and the reflector changes.

Figure 15:
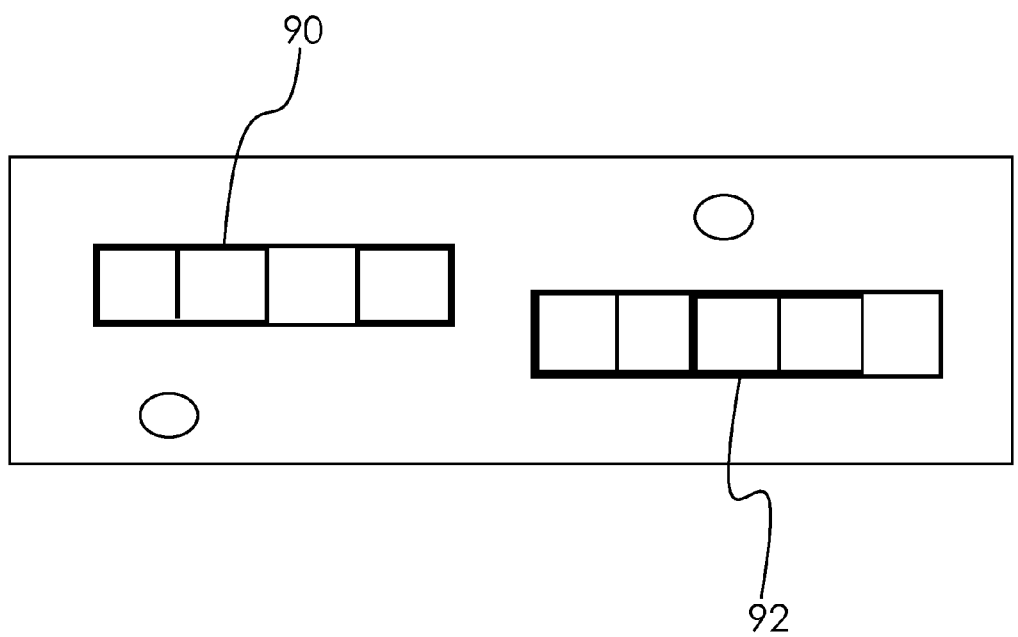
FIG. 15 is a schematic diagram of two offset hemispherical illumination sources according to one embodiment of the present disclosure.

FIG. 15 illustrates a custom LED package that places two LED arrays 90, 92 within close proximity to one another and slightly offset from one another (i.e., the axis of each LED array 90, 92 is not collinear with the other axis). This allows the utilization of dual filament optical design techniques and current optimization software. Such a package makes a combined low and high beam LED headlamp possible. In the illustrated embodiments of FIGS. 12-14, the LED arrays 50, 60 and 80 are configured as shown in FIG. 15.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected. For example, the presently disclosed embodiments have been illustrated using LED illumination sources; however, it will be appreciated by those skilled in the art that any hemispherical (or substantially hemispherical) illumination technology may be used instead of LED technology, and the present disclosure is intended to cover those alternatives. Although the above disclosure is illustrated for lamps used as forward lighting devices on vehicles, the concepts of the present disclosure can obviously be used for any lamp where high efficiency collection of light is required. Though white light is mentioned, any color of light can be used, including infrared or other non-visible wavelengths. Most reflectors used in this kind of lighting are parabolic or elliptical in form, but other shapes that control the direction of the light are also covered, including free-form reflector shapes designed by various computer programs.

What is claimed:

1. An illumination source, comprising a reflector having an optical axis, intersecting a focus and a vertex of the reflector, wherein said reflector comprises a shape around the vertex at a center part of said reflector, the improvement comprising:
    an elongate mounting structure with a first end and a second end, said first end mounted adjacent a distal edge of said reflector distal to said vertex and outside said optical axis of said reflector, said second end extending toward said optical axis away from said distal edge, said second end intersecting said optical axis distal to said vertex;
    a first substantially hemispherical illumination source mounted centrally on said mounting structure, said first substantially hemispherical illumination source having a first source axis, said first substantially hemispherical illumination source being disposed adjacent said reflector and directed toward said reflector;
    wherein said first source axis and said optical axis form a first angle therebetween, said first angle being greater than zero degrees and less than 90 degrees;
    a second substantially hemispherical illumination source mounted centrally on said mounting structure, said second substantially hemispherical illumination source having a second source axis, said second substantially hemispherical illumination source being disposed adjacent said reflector and directed toward said reflector;
    wherein said second source axis and said optical axis form a second angle therebetween, said second angle being greater than zero degrees and less than 90 degrees; and,
    wherein said first substantially hemispherical illumination source and said second substantially hemispherical illumination source provide light falling on the center part of the reflector at the vertex.

2. The illumination source of claim 1, wherein:
    said reflector has an axis of symmetry; and
    said axis of symmetry extends through said first substantially hemispherical illumination source.

3. The illumination source of claim 1, wherein the first substantially hemispherical illumination source comprises at least one LED.

4. The illumination source of claim 1, wherein the second substantially hemispherical illumination source comprises a first linear array of LEDs and a second linear array of LEDs, wherein said first and second arrays are slightly offset from one another with an the axis of said first and second LED array not collinear with the other axis to provide two distinct beam distributions with one beam distribution shifted with respect to the other.

5. The illumination source of claim 1, wherein said reflector comprises a shape selected from the group consisting of: parabolic, elliptical.

6. The illumination source of claim 1, wherein:
said first source axis intersects said distal edge.

7. The illumination source of claim 6, wherein said distal edge comprises a widest portion of said reflector.

8. The illumination source of claim 1, wherein said first and second substantially hemispherical illumination sources are disposed adjacent one another in a V formation when viewed perpendicular to a plane containing said first and second source axes.

9. The illumination source of claim 8, wherein said first and second substantially hemispherical illumination sources intersect substantially at a focus of the reflector.

10. The illumination source of claim 8, wherein said first and second source axes are perpendicular to one another.

11. The illumination source of claim 8, wherein the second substantially hemispherical illumination source comprises at least one LED.

12. The illumination source of claim 8, wherein the second substantially hemispherical illumination source comprises a third linear array of LEDs and a fourth linear array of LEDs, wherein said third and fourth arrays are slightly offset from one another with an the axis of said third and fourth LED array not collinear with the other axis to provide two distinct beam distributions with one beam distribution shifted with respect to the other.

13. The illumination source of claim 12, wherein:
said reflector has a vertex and an edge distal of said vertex; and
said second source axis intersects said edge.

14. The illumination source of claim 13, wherein said edge comprises a widest portion of said reflector.

15. The illumination source of claim 1, and further comprising a third substantially hemispherical illumination source mounted to a third mounting surface of said mount structure;
wherein said first, second and third substantially hemispherical illumination sources are all disposed in different planes.

16. The illumination source of claim 15, wherein said third substantially hemispherical illumination source directs light to the shadowed section of the reflector not illuminated by said first and second substantially hemispherical illumination source.

17. The illumination source of claim 3, wherein said mounting structure includes a heat sink to carry heat away from the LEDs.

18. The illumination source of claim 4, wherein said mounting structure includes a heat sink to carry heat away from the LEDs.

19. The illumination source of claim 11, wherein said mounting structure includes a heat sink to carry heat away from the LEDs.

* * * * *